United States Patent Office 3,086,833
Patented Apr. 23, 1963

3,086,833
DIAZONIUM SALT COMPOSITIONS AND METHOD OF PRODUCING THE SAME
Clemens Streck, Loudonville, N.Y., assignor to General Aniline & Film Corporation, New York, N.Y., a corporation of Delaware
No Drawing. Filed June 21, 1960, Ser. No. 37,586
20 Claims. (Cl. 8—79)

This invention relates to a process for reducing dusting in powders and for otherwise improving certain properties thereof whereby their utility is augmented. More particularly this invention relates to the treatment of powdered stabilized diazo compounds whereby dusting is greatly reduced and the solubility or dispersibility of these powders in water is greatly enhanced. The present invention also encompasses within its scope the novel compositions resulting from the process of my invention.

An important object of this invention is the treatment of powdered stabilized diazo compounds to reduce the tendency thereof to dust and to enhance the solubility and dispersibility thereof in water.

Another object of this invention is the provision of substantially non-dusting powdered stabilized diazo compounds which have enhanced solubility and dispersibility in water.

Other objects and advantages of this invention will appear from the following detailed description.

It is customary in the manufacture of organic color compounds, i.e. dyestuffs organic pigments, as well as in the manufacture of dyestuff intermediates, to prepare these materials in powder form. In this way, economy and convenience in handling and shipping is achieved.

These advantages of using the materials in powder form are greatly offset by their tendency to become objectionably dusty in handling, a condition brought about by air-lifting of very fine particles which are always present in the powders. The degree of dusting will vary in accordance with the concentration of the very fine particles in the powders, as well as on the conditions surrounding the handling of the powders. Among these conditions are included the presence and magnitude of neighboring air currents, the length of fall in pouring, the vigor with which the powders are packed, and with which the packages are handled. The dusting in some instances may be so slight as to be negligible. On the other hand, in extremely pronounced cases it is a health hazard, causing pneumoconiosis or skin irritations among the workers, as well as a noticeable loss of material. In pronounced cases of dusting packaging, pouring, and measuring are difficult while, in extreme cases, accurate measurement is sometimes a practical impossibility due to loss of material.

Among the materials which are subject to dusting and its above-described disadvantages are the water-soluble stabilized diazonium salts known as Fast Color Salts.

These salts are produced by diazotization of primary amines which are generally stabilized by forming complex double salts of the diazonium chlorides with certain inorganic salts capable of forming double salts. Among the preferred salts are the chlorides of zinc, tin, cadmium and manganese. Also capable of stabilizing the diazo compounds by forming complex double salts therewith are the chlorides of mercury, iron, antimony, platinum, gold, copper and arsenic. Borohydrofluoric acid and its alkali metal salts, such as sodium fluoroborate, are also extensively used to form stable complex double salts with the diazonium compounds. In some cases where the stability of the diazonium compound itself is somewhat greater than usual, the diazo compounds can be stabilized as diazonium chlorides and sulfates. Certain organic sulfonic acids are also used as complex salt-forming stabilizers. Among these are alkyl sulfonic acids and aryl sulfonic acids such as naphthalene sulfonic acids, particularly 1,5-naphthalene disulfonic acid and 1,3,6-naphthalenetrisulfonic acid.

As indicated previously, these stabilized water-soluble complex double salts, known technically as Fast Color Salts, where in the powder form, have disadvantages described above.

A further disadvantage inherent in the powders is one of difficulty of forming solutions and suspensions. In order to employ Fast Color Salts as dye intermediates it is necessary to bring them into solution. In many cases, because of an inherent insolubility of the material and because of the interfacial tension existing between the solvent and the powder, it is difficult, sometimes even impossible, to bring such powders into a solution which is free from lumps of undissolved powder. In many instances the wetting out is slow. Also, in many cases it is desirable to obtain higher concentrations than are ordinarily possible. The ability to dissolve the Fast Color Salt easily, quickly, to obtain smooth slurries free from lumps, and to obtain any desired high concentration are important to dye houses which make up slurries of dyes for use in their dyeing machines.

Another disadvantage of the Fast Color Salts is the fact that, in spite of the stabilization of the diazonium salts through complex double salt formation, these salts nevertheless tend to deteriorate on storage and when exposed to light.

In accordance with this invention, I am able to produce Fast Color Salt powders, which are non-dusting, have enhanced solubility characteristics, and have improved stability during storage and to light, by incorporating powdered glucose with the powdered Fast Color Salt. Any available grade of glucose, commercial or otherwise, is suitable for use in practicing this invention.

In general, the improved stabilized diazonium compounds are produced by mechanically mixing 1 part by weight of powdered stabilized diazonium compound with about from 0.2 to 2 parts by weight of powdered glucose. Any suitable procedure for obtaining intimate mixtures of powders, such as milling, can be used.

The following specific examples are illustrative of the invention; but it will readily be appreciated that they do not constitute a limitation on its scope.

Example 1

70 parts by weight of a stabilized diazo compound constituted by the zinc chloride double salt of diazotized 4-chloro-2-nitroaniline (Fast Red Salt 3GL) and 30 parts by weight of Cerelose (glucose) are thoroughly mixed by milling together in a small mixing device. The treated powder is non-dusting, has improved solubility over the non-treated product, and is less sensitive to deterioration on storage and on exposure to light than the non-treated product.

Example 2

350 parts by weight of a stabilized diazo compound constituted by the zinc chloride double salt of tetrazotized dianisidine (Fast Blue Salt BN) and 400 parts by weight of Cerelose are thoroughly mixed by milling together in a small mixing device. The treated powder is non-dusting, has improved solubility over the non-treated product, and is less sensitive to deterioration on storage and on exposure to light than the non-treated product.

Example 3

225 parts by weight of a stabilized diazo compound constituted by the zinc chloride double salt of diazotized 5-butylsulfamyl-o-anisidine (Fast Red Salt PDC) and 310 parts by weight of Cerelose are thoroughly mixed by milling together in a small mixing device. The treated powder is non-dusting, has improved solubility over the non-treated product, and is less sensitive to deterioration on storage and on exposure to light than the non-treated product.

*Example 4*

250 parts by weight of a stabilized diazo compound constituted by the zinc chloride double salt of diazotized 5-nitro-o-anisidine (Fast Scarlet Salt RN) and 200 parts by weight of Cerelose are thoroughly mixed by milling together in a small mixing device. The treated powder is non-dusting, has improved solubility over the non-treated product, and is less sensitive to deterioration on storage and on exposure to light than the non-treated product.

*Example 5*

200 parts by weight of a stabilized diazo compound constituted by the zinc chloride double salt of diazotized 5-nitro-o-anisidine (Fast Scarlet Salt RN) and 200 parts by weight of Cerelose are thoroughly mixed by milling together in a small mixing device. The treated powder is non-dusting, has improved solubility over the non-treated product, and is less sensitive to deterioration on storage and on exposure to light than the non-treated product.

*Example 6*

200 parts by weight of a stabilized diazo compound constituted by the zinc chloride double salt of diazotized 4-benzoylamido-2,5-dimethoxyaniline (Fast Blue Salt RR) and 150 parts by weight of Cerelose are thoroughly mixed by milling together in a small mixing device. The treated powder is non-dusting, has improved solubility over the non-treated product and is less sensitive to deterioration on storage and on exposure to light than the non-treated product.

*Example 7*

200 parts by weight of a diazo compound constituted by the sulfate of diazotized 4-(o-tolylazo)-o-toluidine (Fast Garnet Salt GBC) and 180 parts by weight of Cerelose are thoroughly mixed by milling together in a small mixing device. The treated powder is non-dusting, has improved solubility over the nontreated product, and is less sensitive to deterioration on storage and to exposure to light than the non-treated product.

*Example 8*

200 parts by weight of a diazo compound constituted by the boron fluoride of diazotized m-chloroaniline (Fast Orange Salt GCS) and 220 parts by weight of Cerelose are thoroughly mixed by milling together in a small mixing device. The treated powder is non-dusting, has improved solubility over the non-treated product and is less sensitive to deterioration on storage and to exposure to light than the non-treated product.

*Example 9*

200 parts by weight of a diazo compound constituted by 1,5-naphthalenedisulfonate of diazotized 4-nitro-o-anisidine and 220 parts by weight of Cerelose are thoroughly mixed by milling together in a mixing device. The treated product is non-dusting, has improved solubility over the non-treated product and is less sensitive to deterioration on storage and on exposure to light than the non-treated product.

It is to be understood that the foregoing detailed description is given merely by way of illustration and that many variations may be made therein without departing from the spirit of this invention.

What is claimed is:

1. The method of producing a dust-free powdered stabilized diazo compound of improved water-solubility and exhibiting decreased deterioration during storage and on exposure to light, which comprises mixing powdered glucose with a powdered water-soluble stabilized diazo compound.

2. The method of producing a dust-free powdered stabilized diazo compound of improved water-solubility and exhibiting decreased deterioration during storage and on exposure to light, which comprises mixing with a powdered water-soluble stabilized diazo compound about from 0.2 to 2 parts by weight of powdered glucose.

3. The method of claim 2 wherein the stabilized diazo compound is the zinc chloride double salt of diazotized 4-chloro-2-nitroaniline.

4. The method of claim 2 wherein the stabilized diazo compound is the zinc chloride double salt of tetrazotized dianisidine.

5. The method of claim 2 wherein the stabilized diazo compound is the zinc chloride double salt of diazotized 5-butylsulfamyl-o-anisidine.

6. The method of claim 2 wherein the stabilized diazo compound is the zinc chloride double salt of diazotized 5-nitro-o-anisidine.

7. The method of claim 2 wherein the stabilized diazo compound is the zinc chloride double salt of diazotized 4-benzoylamido-2,5-dimethoxyaniline.

8. The method of claim 2 wherein the stabilized diazo compound is the sulfate of diazotized 4-(o-tolylazo)-o-toluidine.

9. The method of claim 2 wherein the stabilized diazo compound is the boron fluoride of diazotized m-chloro aniline.

10. The method of claim 2 wherein the stabilized diazo compound is the 1,5-naphthalenedisulfonate of diazotized 4-nitro-o-anisidine.

11. A composition of matter comprising a powdered stabilized diazo compound admixed with powdered glucose.

12. A composition of matter comprising a powdered stabilized diazo compound admixed with about from 0.2 to 2 parts by weight of powdered glucose.

13. The composition of claim 12 wherein the stabilized diazo compound is the zinc chloride double salt of diazotized 4-chloro-2-nitroaniline.

14. The composition of claim 12 wherein the stabilized diazo compound is the zinc chloride double salt of tetrazotized dianisidine.

15. The composition of claim 12 wherein the stabilized diazo compound is the zinc chloride double salt of diazotized 5-butylsulfamyl-o-anisidine.

16. The composition of claim 12 wherein the stabilized diazo compound is the zinc chloride double salt of diazotized 5-nitro-o-anisidine.

17. The composition of claim 12 wherein the stabilized diazo compound is the zinc chloride double salt of diazotized 4-benzoylamido-2,5-dimethoxyaniline.

18. The composition of claim 12 wherein the stabilized diazo compound is the sulfate of diazotized 4-(o-tolylazo)-o-toluidine.

19. The composition of claim 12 wherein the stabilized diazo compound is the boron fluoride of diazotized m-chloroaniline.

20. The composition of claim 12 wherein the stabilized diazo compound is the 1,5-naphthalenedisulfonate of diazotized 4-nitro-o-anisidine.

References Cited in the file of this patent

UNITED STATES PATENTS

| | | |
|---|---|---|
| 2,000,807 | Wig | May 7, 1935 |
| 2,052,175 | Haurand | Aug. 25, 1936 |
| 2,155,326 | O'Brien | Apr. 18, 1939 |
| 2,376,656 | Buchanan | May 22, 1945 |
| 2,441,341 | Vitalis | May 11, 1948 |
| 2,486,562 | Iamarino | Nov. 1, 1949 |
| 2,992,188 | Miller et al. | July 11, 1961 |

FOREIGN PATENTS

| | | |
|---|---|---|
| 443,998 | Great Britain | Mar. 11, 1936 |